Dec. 6, 1938. C. E. FREDERICKSON 2,139,405
DIFFERENTIAL MECHANISM
Filed Aug. 23, 1937  4 Sheets-Sheet 1
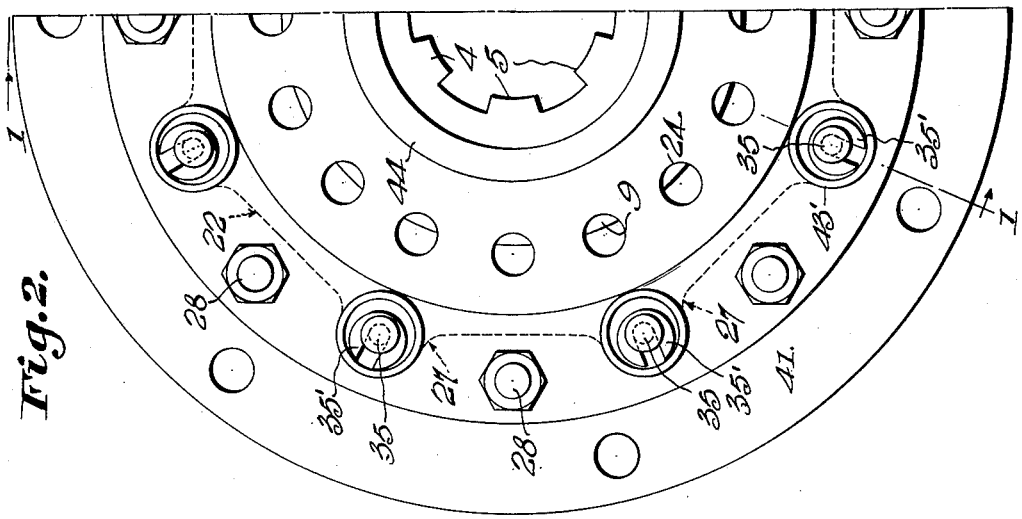

Dec. 6, 1938. C. E. FREDERICKSON 2,139,405
DIFFERENTIAL MECHANISM
Filed Aug. 23, 1937 4 Sheets-Sheet 2
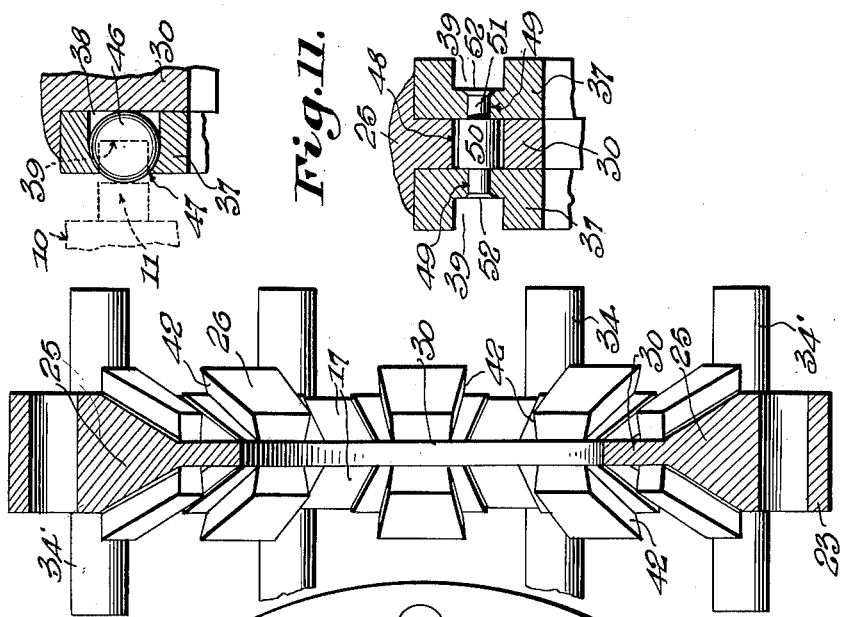
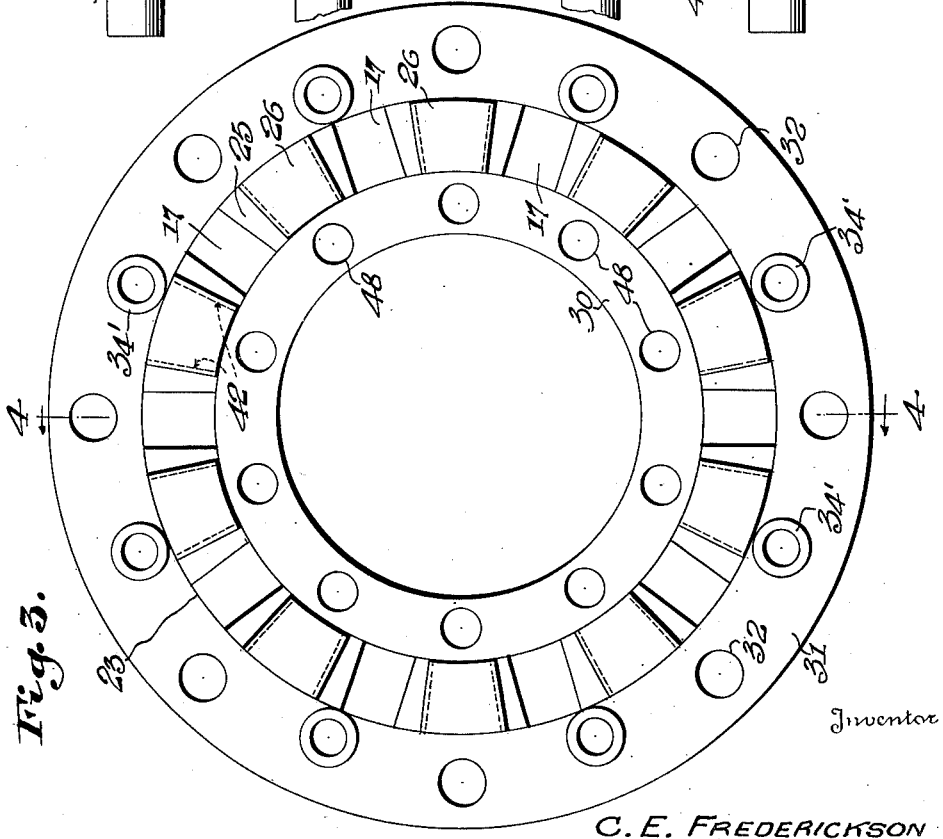

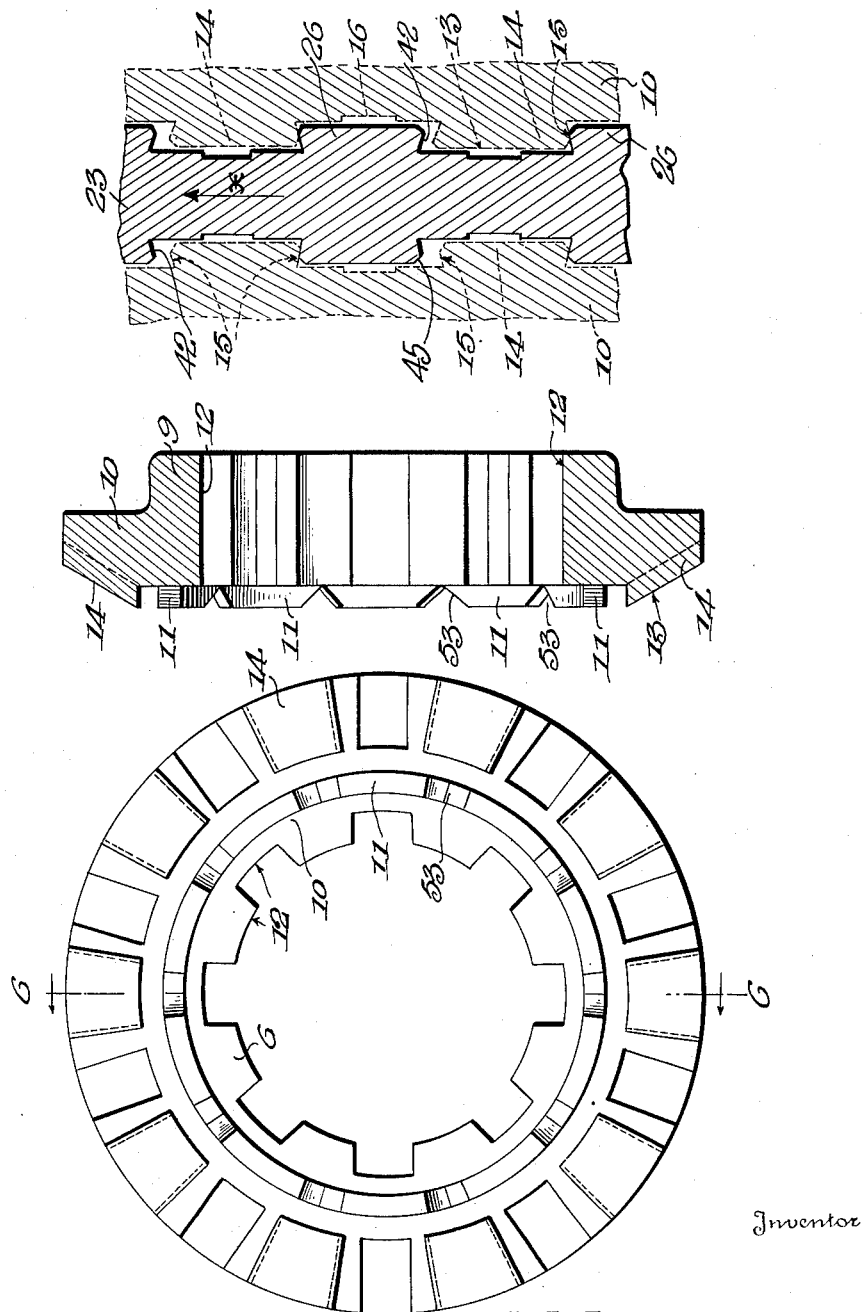

Dec. 6, 1938.   C. E. FREDERICKSON   2,139,405
DIFFERENTIAL MECHANISM
Filed Aug. 23, 1937   4 Sheets-Sheet 4

Inventor
C. E. FREDERICKSON
By Albert F. Dieterich and
Theodore H. Rutley   Attorney Patented Dec. 6, 1938

2,139,405

UNITED STATES PATENT OFFICE 2,139,405

DIFFERENTIAL MECHANISM

Clayton E. Frederickson, Chicago, Ill.

Application August 23, 1937, Serial No. 160,535

10 Claims. (Cl. 74—389.5)

My invention relates to the art of wheeled motor vehicles and particularly to that part of the vehicle known as the "differential". Differentials may generally be classed in two types: the geared and the gearless. The present invention relates to the gearless type, and it particularly has for its object to provide such a differential of as few parts as possible and one possessing a minimum amount of lost motion.

Further, the invention has for an object to provide a gearless differential which may be used on all types of cars and in other places where differentials are employed.

A further object of the invention is to improve the mechanism disclosed in Letters Patent #2,050,304, issued Aug. 11, 1936, and that disclosed in my application filed March 31, 1936, Ser. #71,945, so as to render the mechanism smoother running and as noiseless as possible.

Further, it is an object to improve the mechanisms aforesaid in such manner as to insure a positive "lift" of one driven clutch plate without driving back the other driven clutch plate when one clutch plate disengages and moves ahead.

Again, it is an object of the present invention to reduce friction between the driving clutch member and the driven clutch plates or members while they are in the acts of engaging and disengaging.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:—

Fig. 1 is a vertical section of the invention, the section being taken on the line I—I of Fig. 2.

Fig. 2 is a side elevation of one-half of the structure comprising my invention.

Fig. 3 is a side elevation of the driving clutch plate or member.

Fig. 4 is a vertical section of the same on the line 4—4 of Fig. 3.

Fig. 5 is a side elevation of one of the driven clutch plates or members.

Fig. 6 is a section on the line 6—6 of Fig. 5.

Fig. 9 is an enlarged detail view, illustrating how the teeth of the driving and driven clutch members engage.

Fig. 10 and Fig. 11 are enlarged detail views hereinafter referred to.

Figure 8:
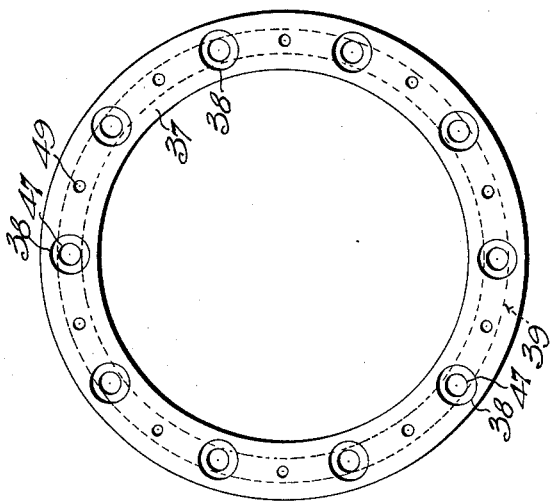
Fig. 8 is a side elevation of the same, looking at it from the inner side.
Figure 7:
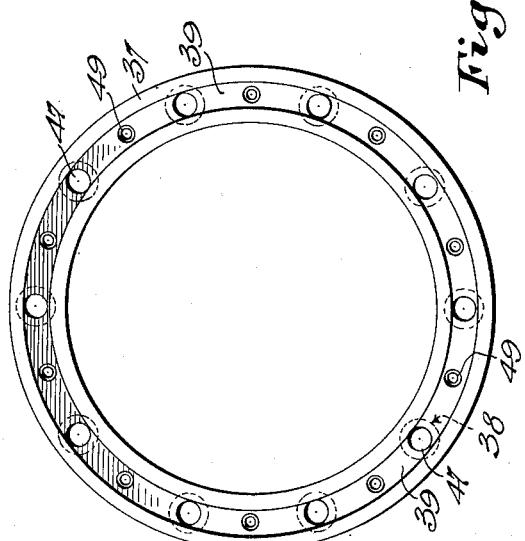
Fig. 7 is a side elevation of one of the antifriction lug carrying rings, looking at it from the outer side.
Figure 12:
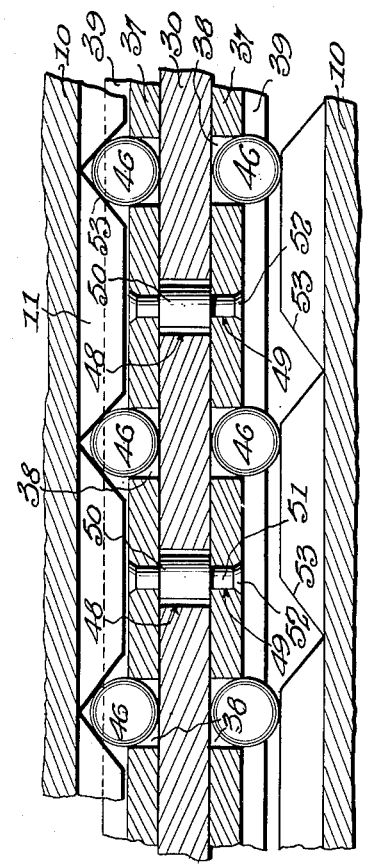
Fig. 12 is a developed section showing how the notches or recesses in the driven clutch members cooperate with the antifriction lugs (balls or rollers) of the carrying rings.

In the drawings, in which like numerals of reference indicate like parts in all the figures, 1 and 2 represent the respective shafts or axles of an automobile rear axle assembly. These shafts are located in alignment and their adjacent ends are provided with spline grooves 3.

A spline collar 4, having internal splines 5, is fitted on each shaft. These collars have a tight fit on the shafts, although the shafts may be pulled out of the collars when it is desired to remove and replace the shafts. These collars are also provided with external splines 6 which engage with the spline grooves 12, hereinafter again referred to. The collars 4 have external bearing surfaces 7 to receive the center ring 18 which keeps the ends of the collars against frictional contact with one another. Each collar 4 has a bearing surface 8 for the hub of the adjacent driven clutch plate or member 10. The hubs 9 have the spline grooves 12, hereinbefore mentioned.

Each driven clutch member 10 has a notched cam ring-flange 11 and a set of clutch teeth 14 on its face 13, the clutch teeth being inclined to the vertical at an angle, preferably, of 25 to 30 degrees. The driving edges of the clutch teeth 14 are undercut as at 15 (see Fig. 9), the purpose of which will later appear. The inner walls of the valleys between adjacent teeth are radially grooved as at 16, the purpose of which will also later appear. The two side clutch members 10—10 are of like construction, so the description of one of them will suffice for both.

The driving clutch plate or member 23 is illustrated in detail in Figures 3 and 4, by reference to which it will be seen that it has a portion 25 having inclined clutch teeth 26 on both sides, the valleys between adjacent teeth being radially grooved as at 17. The driving clutch member is in the form of a ring, having a central flange 30.

The member 23 has an apertured peripheral flange 31 which is provided with apertures 32 for passage of the bolts 28, later again referred to.

The driving edges of the teeth 26 are undercut, as at 42.

The differential casing or cage member is composed of two similar sections 19 and 20, each of which has oil-circulating holes 24 and a hub 44, the latter serving as a bearing for the collar 4. Side thrust wear rings 21 are provided as shown. At the outer side of each driven clutch member 10 is a ring plate 22 having ears 27 apertured for the passage of the sleeves 34' and the cross pins 34 which carry spring abutments 43 and 43' and springs 36 that serve continuously to urge the members 10—10 toward one another, and also serve, in combination with the pins 34 and abutments 43, 43', to limit the distance to which the members 10—10 may be separated.

The casing sections 19 and 20 have holes 40 for the abutments 43, 43' to pass through. At least one of the casing sections has a flange 41 to which the usual ring gear (not shown) may be secured in any suitable way, as by bolts or rivets. The casing sections also have holes 33 through which the bolts 28 pass.

The cross pins 34 are made, for convenience in assembling, with an integral head 43 and a grooved end 35 to which the other head 43' is held by a key 35'.

Located in radial alignment with each tooth 14, the clutch members 10 have their ring-flanges 11 provided with V-shaped recesses or notches to receive the antifriction members 46, thereby forming a succession of cam portions between adjacent notches. Located at each side of the flange 30, is an antifriction member carrying ring 37, the two rings being permanently secured to the flange in a manner presently to be described. Each ring 37, on its outer face, has an annular groove 39 to receive the adjacent flange 11; it is also provided with openings 38 in its inner face to receive the antifriction members 46 (bearing balls or rollers, balls being shown for illustrative purposes in the accompanying drawings). The holes 38 are reduced at their outer ends, as at 47, to prevent the antifriction members 46 from passing through while still permitting them to project into the groove 39 to cooperate with the notches 53 and cam portions of the ring flange 11.

The flange 30 is provided at suitable intervals with holes 48 to receive the rivet bodies 50 whose reduced portions 51 pass through holes 49 in the rings 37 and are upset as at 52. The bodies 50 are preferably cylindrical and the holes 48 circular. The holes 48 are of a sufficiently larger diameter than the diameter of the bodies 50 to allow limited rotational movement of the rings as a unit along the flange 30; the amount of movement should be equal to the amount of lost motion between clutch teeth 14 and 26 (see Fig. 9).

*Operation*

Assuming the vehicle to be running forward or backward in a straight line, the parts will be in the position indicated in Fig. 9 with both clutch members 10 in full mesh with the clutch member 23. In this position assume the member 23 to be moving in the direction of the arrow $x$ in Fig. 9. The undercut portions 42 on the advance edges of the teeth 26 will engage the undercut portions 15 on the trailing edges of the teeth 14 and interlock therewith, as it were; the inclinations of the contacting parts serve to tend to draw together the three clutch members 23, 10 and 10.

When the vehicle turns, the outside wheel will be moving faster than the inside wheel and consequently antifriction members 46 and flange cams 53 will unmesh, thereby forcing the cam plate of the outside wheel out of mesh with the driving plate 23, at which time the parts will be positioned as shown in Fig. 1. When the machine again straightens out, the parts will mesh once more and driving power will be applied to both shaft sections 1 and 2. The only lost motion encountered is that due to the depths of the undercut portions of the teeth 26 and 14 (see Fig. 9), which is approximately equal to the pitch of cam notches 53.

By providing the radial grooves 16 and 17 in the recesses or valleys between adjacent teeth, lubricant will pass therein and serve to prevent wear and will eliminate any tendency of the faces to stick together. Furthermore, the edge corners of the teeth 26 and 14 are preferably beveled, as at 45, to make engagement and disengagement easy and to prevent chipping of the teeth.

The provision of the antifriction balls 46 (or rollers, if preferred) in lieu of fixed lugs or teeth, enables the mechanism to operate more freely and without the noise necessarily present in my former differential mechanisms hereinbefore referred to.

From the foregoing it will be seen that my improved differential compensates for curves automatically. In the straight-away it transmits power equally and positively to both driving wheels of the vehicle and turns them at exactly equal speeds regardless of their traction. If both wheels lose their grip on the road, it is only necessary to provide traction for one wheel to be on one's way.

The invention has other advantages over the gear type of differentials, which advantages will be clear to those skilled in the art.

While I have illustrated a preferred embodiment of the invention, it is to be understood that changes in the construction and arrangement of parts may be made within the scope of the appended claims without departing from the spirit of the invention.

What I claim is:

1. A differential comprising a driving clutch member having a series of clutch teeth on its opposite sides, two driven clutch members located one at each side of said driving clutch member and having clutch teeth to mesh respectively with those of said driven clutch members, means continuously tending to hold said clutch members in mesh, two shaft sections, means to mount said driven clutch members on said shaft sections so that said driven clutch members will turn with and be slidable along said shaft sections, means to limit the movement apart of said driven clutch members to a distance such that only one driven clutch member at a time can be unmeshed from the driving clutch member, antifriction members carried by said driving clutch member, and means to hold said antifriction members against linear movement save as a unit with said driving clutch member and cam elements carried by said driven clutch members to cooperatively engage with said antifriction members for the purpose of causing the overrunning one of said driven clutch members to unmesh its teeth from those of the driving clutch member.

2. A differential comprising a driving clutch member having a series of clutch teeth on its opposite sides, two driven clutch members located one at each side of said driving clutch member and having clutch teeth to mesh respectively with those of said driven clutch members, means continuously tending to hold said clutch members in mesh, two shaft sections, means to mount said driven clutch members on said shaft sections so that said driven clutch members will turn with and be slidable along said shaft sections, means to limit the movement apart of said driven clutch members to a distance such that only one driven clutch member at a time can be unmeshed from the driving clutch member, a pair of antifriction member carrying rings, one located between each of said driven clutch members and said driving clutch member, antifriction members carried by said rings, and means coupling said rings together to said driving clutch member, said driven clutch members having notched annular flanges to cooperate with said antifriction members.

3. A differential comprising a driving clutch member having a series of clutch teeth on its opposite sides, two driven clutch members located one at each side of said driving clutch member and having clutch teeth to mesh respectively with those of said driven clutch members, means continuously tending to hold said clutch members in mesh, two shaft sections, means to mount said driven clutch members on said shaft sections so that said driven clutch members will turn with and be slidable along said shaft sections, means to limit the movement apart of said driven clutch members to a distance such that only one driven clutch member at a time can be unmeshed from the driving clutch member, a pair of antifriction member carrying rings, one located between each of said driven clutch members and said driving clutch member, antifriction members carried by said rings, and means coupling said rings together to said driving clutch member, said driven clutch members having notched annular flanges to cooperate with said antifriction members, said coupling means including means whereby said rings, moving in unison, have limited annular lost motion on said driving clutch member.

4. A differential comprising a driving clutch member having a series of clutch teeth on its opposite sides, two driven clutch members located one at each side of said driving clutch member and having clutch teeth to mesh respectively with those of said driven clutch members, means continuously tending to hold said clutch members in mesh, two shaft sections, means to mount said driven clutch members on said shaft sections so that said driven clutch members will turn with and be slidable along said shaft sections, means to limit the movement apart of said driven clutch members to a distance such that only one driven clutch member at a time can be unmeshed from the driving clutch member, said driving clutch member having a web, a pair of antifriction member carrying rings, one located at each side of said web, antifriction members carried by said rings, said web having holes, and means passing through said holes for securing said rings together as a unit on said web, said driven clutch members having cam-elements to cooperate with said antifriction members for purposes described.

5. A differential comprising a driving clutch member having a series of clutch teeth on its opposite sides, two driven clutch members located one at each side of said driving clutch member and having clutch teeth to mesh respectively with those of said driven clutch members, means continuously tending to hold said clutch members in mesh, two shaft sections, means to mount said driven clutch members on said shaft sections so that said driven clutch members will turn with and be slidable along said shaft sections, means to limit the movement apart of said driven clutch members to a distance such that only one driven clutch member at a time can be unmeshed from the driving clutch member, said driving clutch member having a web, a pair of antifriction member carrying rings, one located at each side of said web, antifriction members carried by said rings, said web having holes, and means passing through said holes for securing said rings together as a unit on said web, said driven clutch members having cam-elements to cooperate with said antifriction members for purposes described, the holes in said web being larger than the securing means passing through the same so as to provide for a limited amount of lost rotary motion in said rings.

6. A differential comprising a driving clutch member having a series of clutch teeth on its opposite sides, two driven clutch members located one at each side of said driving clutch member and having clutch teeth to mesh respectively with those of said driven clutch members, means continuously tending to hold said clutch members in mesh, two shaft sections, means to mount said driven clutch members on said shaft sections so that said driven clutch members will turn with and be slidable along said shaft sections, means to limit the movement apart of said driven clutch members to a distance such that only one driven clutch member at a time can be unmeshed from the driving clutch member, said driving clutch member having a web, a pair of antifriction member carrying rings, one located at each side of said web, antifriction members carried by said rings, said web having holes, and means passing through said holes for securing said rings together as a unit on said web, said rings having annular grooves on their outer faces into which their antifriction members project, said driven clutch members having cam-elements to cooperate with said members for purposes described, said cam-elements comprising notched ring-flanges to ride in said annular grooves.

7. A differential comprising a driving clutch member, aligned shaft sections, a casing to which a driving gear may be applied, means to mount said clutch member in said casing around the adjacent ends of said shaft sections, said driving clutch member having on both sides like annular series of spaced generally radially disposed clutch teeth, two independently driven clutch members located at opposite sides of said driving clutch member, one hundred on each shaft section to turn therewith and be slidable along the same, said two clutch members each having clutch teeth to cooperate with those of said driving clutch member, springs urging said driven clutch members into mesh with said driving clutch member, said teeth being adapted to unmesh and permit one driven clutch member to unmesh from said driving clutch member when unequal torque resistance is encountered by the shaft sections, the spaces between adjacent clutch teeth of the several clutch members having their inner wall-faces radially grooved, said clutch teeth being narrower than the spaces in which they lie so as to provide some lost motion; antifriction members carried by said driving clutch member, means to hold said antifriction members against linear movement save as a unit with said driving clutch and cam-elements carried by said driven clutch members to cooperate with said antifriction members to cause the overrunning one of said driven clutch members to unmesh its teeth from those of said driving clutch member.

8. A differential comprising a driving clutch member, aligned shaft sections, a casing to which a driving gear may be applied, means to mount said clutch member in said casing around the adjacent ends of said shaft sections, said driving clutch member having on both sides like annular series of spaced generally radially disposed clutch teeth, two independently driven clutch members located at opposite sides of said driving clutch member, one mounted on each shaft section to turn therewith and be slidable along the same, said two clutch members each having clutch teeth to cooperate with those of said driving clutch member, springs urging said driven clutch members into mesh with said driving clutch member, said teeth being adapted to unmesh and permit one driven clutch member to unmesh from said driving clutch member when unequal torque resistance is encountered by the shaft sections, the spaces between adjacent clutch teeth of the several clutch members having their inner wall-faces radially grooved, said clutch teeth being narrower than the spaces in which they lie so as to provide some lost motion; antifriction members carried by said driving clutch member, and cam-elements carried by said driven clutch members to cooperate with said antifriction members to cause the overrunning one of said driven clutch members to unmesh its teeth from those of said driving clutch member, said antifriction members as a unit also having a limited amount of lost motion in a direction around the axis of said driving clutch member.

9. In a differential mechanism, a two-part casing having bearing hubs, two splined collars journaled in said hubs and each adapted to receive the end of an axle member, a driven clutch member slidably mounted on each collar and rotatable therewith, a driving clutch member mounted in said casing between said driven clutch members, said driving and said driven clutch members having engaging clutch teeth, said driving and driven clutch members having engaging cam elements, means continuously urging said clutch members together and limiting their separation apart to a predetermined distance, said means including a set of combined spring and cross pin units carried by the casing and operatively connected with said driven clutch members, and a set of sleeves carried by said driving clutch member through which said cross pins pass.

10. In a differential mechanism, a two-part casing having bearing hubs, two splined collars journaled in said hubs and each adapted to receive the end of an axle member, a driven clutch member slidably mounted on each collar and rotatable therewith, a driving clutch member mounted in said casing between said driven clutch members, said driving and said driven clutch members having engaging clutch teeth, said driving and driven clutch members having engaging cam elements, means continuously urging said clutch members together and limiting their separation apart to a predetermined distance, said means comprising ring plates engaging said driven clutch members, spring cups engaging said plates, cross pins passing through apertures in said casing and said driven clutch members and said cups, springs in the cups on the pins for purposes described, said pins each comprising two sections secured together for purposes described, and a set of sleeves carried by said driving clutch member and passing through holes in said ring plates and through which sleeves said pins pass.

CLAYTON E. FREDERICKSON.